United States Patent
Schneider et al.

(10) Patent No.: US 9,589,241 B2
(45) Date of Patent: Mar. 7, 2017

(54) ELECTRICAL RESOURCE CONTROLLER

(75) Inventors: John Felix Schneider, Huntingburg, IN (US); Christopher Allen Brown, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1058 days.

(21) Appl. No.: 13/077,913

(22) Filed: Mar. 31, 2011

(65) Prior Publication Data

US 2012/0253881 A1 Oct. 4, 2012

(51) Int. Cl.
| | |
|---|---|
| G05F 3/08 | (2006.01) |
| G05F 1/613 | (2006.01) |
| G05F 3/12 | (2006.01) |
| G06Q 10/06 | (2012.01) |
| G06Q 50/06 | (2012.01) |

(52) U.S. Cl.
CPC ............. *G06Q 10/06* (2013.01); *G06Q 50/06* (2013.01)

(58) Field of Classification Search
USPC ................ 323/220; 327/11; 388/854; 361/5; 363/8; 705/7.28
See application file for complete search history.

(56) References Cited

U.S. PATENT DOCUMENTS

| | | | |
|---|---|---|---|
| 6,512,966 B2 | 1/2003 | Lof et al. | |
| 7,105,950 B2 | 9/2006 | Bemat et al. | |
| 7,372,709 B2 | 5/2008 | Mazumder et al. | |
| 7,499,762 B2 | 3/2009 | Khorramshahi | |
| 7,786,617 B2 | 8/2010 | Paik et al. | |
| 2002/0024424 A1* | 2/2002 | Burns et al. | 340/310.01 |
| 2002/0064010 A1* | 5/2002 | Nelson et al. | 361/64 |
| 2004/0095023 A1 | 5/2004 | Jacobson et al. | |

(Continued)

FOREIGN PATENT DOCUMENTS

EP 2159749 3/2010

OTHER PUBLICATIONS

Rizy, et al., Operational and Design Considerations for Electric Distribution Systems with Dispersed Storage and Generation, IEEE Transactions on Power Apparatus and Systems, vol. PAS-104, No. 10, Oct. 1985, pp. 2864-2871.*

(Continued)

*Primary Examiner* — Amber A Misiaszek
(74) *Attorney, Agent, or Firm* — Christopher A. Monsey

(57) ABSTRACT

In an exemplary embodiment of the present disclosure, an electrical system is provided. The system comprises a controller including a plurality of machine implemented processing sequences. The electrical system also includes a plurality of sensors configured to receive input related to the environmental conditions of the environment surrounding the plurality of sensors and transmit the input to the controller, at least one power source in electrical communication with the controller. The electrical system further includes at least one storage device in electrical communication with the controller, and at least one device sensor in communication with an end user. The at least one device sensor includes memory, and the memory includes priority information regarding the priority of a device associated with the at least one device sensor. The at least one device sensor is operable to transmit information to the controller.

22 Claims, 7 Drawing Sheets

(56) References Cited

U.S. PATENT DOCUMENTS

| | | |
|---|---|---|
| 2004/0158360 A1 | 8/2004 | Garland et al. |
| 2008/0077368 A1 | 3/2008 | Nasle |
| 2009/0200988 A1 | 8/2009 | Bridges et al. |
| 2009/0228324 A1 | 9/2009 | Ambrosio et al. |
| 2009/0234512 A1 | 9/2009 | Ewing et al. |
| 2009/0235412 P1 * | 9/2009 | Maillard et al. .............. Plt./195 |
| 2009/0240449 A1 | 9/2009 | Gibala et al. |
| 2009/0281673 A1 | 11/2009 | Taft |
| 2009/0281679 A1 | 11/2009 | Taft et al. |
| 2009/0302616 A1 | 12/2009 | Peterson |
| 2010/0010684 A1 | 1/2010 | Lorenz et al. |
| 2010/0145532 A1 | 6/2010 | Gregory et al. |
| 2010/0145536 A1 | 6/2010 | Masters et al. |
| 2010/0188239 A1 | 7/2010 | Rockwell |
| 2010/0217651 A1 | 8/2010 | Crabtree et al. |
| 2010/0222935 A1 | 9/2010 | Forbes et al. |
| 2010/0231040 A1 | 9/2010 | Schweitzer |

OTHER PUBLICATIONS

Callaway, Duncan, "Achieving Controllability of Electric Loads", Proceedings of the IEEE, vol. 99, No. 1, Jan. 2011, pp. 184-199.*
Abdallah, et al., "Control Dynamics of Adaptive and Scalable Power and Energy Systems for Military Micro Grids," Dec. 2006.
Mazza, Patrick, "The smart energy network: Electrical power for the 21st century," 2002.
Rahman, Saifur, "Intelligent Distributed Autonomous Power Systems (IDAPS)," 2006.

* cited by examiner

ELECTRICAL RESOURCE CONTROLLER

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices to control and distribute electricity. In many electrical systems, remote location may not be in communication with local, regional, national, or international electrical grids. In other electrical systems, a location may have requirements in order to sustain electrical operations while an electrical grid is offline or operating at a limited capacity (i.e., insufficient for demand). Additionally, the deployment of a number of small generators to fulfill electrical needs on a small scale may be inefficient, as the small generators may not be as robust as a fewer number of larger generators, and transporting fuel to many generators may be expensive, time consuming, or dangerous.

SUMMARY OF THE INVENTION

In an exemplary embodiment of the present disclosure, an electrical system is provided. The system comprises a controller including a plurality of machine implemented processing sequences. The electrical system also includes a plurality of sensors configured to receive input related to the environmental conditions of the environment surrounding the plurality of sensors and transmit the input to the controller, at least one power source in electrical communication with the controller. The electrical system further includes at least one storage device in electrical communication with the controller, and at least one device sensor in communication with an end user. The at least one device sensor includes memory, and the memory includes priority information regarding the priority of a device associated with the at least one device sensor. The at least one device sensor is operable to transmit information to the controller. The controller selectively energizes or deenergizes the devices associated with the at least one device sensor based at least in part on the priority information associated with each of the at least one device sensors and on the available energy produced by the at least one power source.

In an additional exemplary embodiment of the present disclosure, the controller of the electrical system utilizes an analytics engine to make power planning decisions, the analytics engine comprising first, second, and third plurality of processing sequences, wherein the first plurality of processing sequences is adapted to perform interface activities with a plurality of potential disruption event databases, the second plurality of processing sequences is adapted to perform business analytics processing based on a plurality of business analytics data, and the third plurality of processing sequences is adapted to produce a plurality of outputs comprising first, second, and third outputs. The potential disruption event databases comprise data from sensors, command and control facilities, weather sources including tsunami reporting, and other real time event reporting databases including national security, civil defense, weather, and intelligence threat databases. The plurality of business analytics data comprises network component data, network data, node power requirements, node chain power consumption data, equipment or function priority data, location data, power grid data, supported entity/mission data, predicted power disruption impact data, power disruption cost data, threat to life indicator, threat to property indicator, threat to critical infrastructure indicator, threat to critical subsystem indicator, lost opportunity cost from disruption data, and predicted time of disruption data. The first output comprises a network disruption prediction report comprising a list of network nodes, missions, locations or other elements which are presently at risk or are predicted to be at risk within 72 hours or less based on outputs from the first, second, and third processing sequences, the plurality of business analytics data, the data from the potential disruption event database, and data provided by the at least one device sensor. The second output comprises a list and at least one network diagram showing a plurality of proposed network disruption prevention actions determined based on: outputs from the first, second, and third processing sequences, the plurality of business analytics data, the data from the potential disruption event database, and data provided by the at least one device sensor. The third output comprises a critical path listing showing critical elements, nodes, or links from the first output with a proposed corrective action, including corrective actions which are automatically implemented by the electrical system.

In another exemplary embodiment of the present disclosure, an electrical system controller is disclosed. The electrical system controller includes a plurality of machine implemented processing sequences, and comprises an adapter to receive data from one or more inputs, including a plurality of sensors operable to receive input related to the environment. The electrical system controller also includes a data aggregator to receive data from the adapter and group the data, an analytics engine to receive the grouped data from the data aggregator and analyze the data, and a control module to receive commands from the analytics engine and relay the commands to one or more devices. The at least one device sensor is in communication with an end user. The at least one device sensor includes memory, and the memory includes priority information regarding the priority of a device associated with the at least one device sensor. The at least one device sensor is operable to transmit information to the adapter. The control module selectively energizes or deenergizes the devices associated with the at least one device sensor based at least in part on the priority information associated with each of the at least one device sensors and on the available energy produced by at least one power source.

In yet another exemplary embodiment of the present disclosure, a method for predicting electrical requirements is disclosed. The method comprises receiving data from one or more inputs, including at least one sensor operable to receive input related to the environment and at least one device sensor operable to receive data from one or more end users regarding power usage and future requirements. The at least one device sensor includes memory, and the memory includes priority information regarding the priority of a device associated with the at least one device sensor. The at least one device sensor is operable to transmit information. The method further includes extracting key signatures from the data received from the one or more inputs, learning the key signatures extracted from the data received from the one or more inputs, and predicting future power requirements associated with the key signatures. The method further includes controlling power generation, storage, and distribution according to the predicted future power requirements by selectively energizing or deenergizing the devices associated with the at least one device sensor based at least in part on the priority information associated with each of the at least one device sensors and on the available energy produced by at least one power source.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
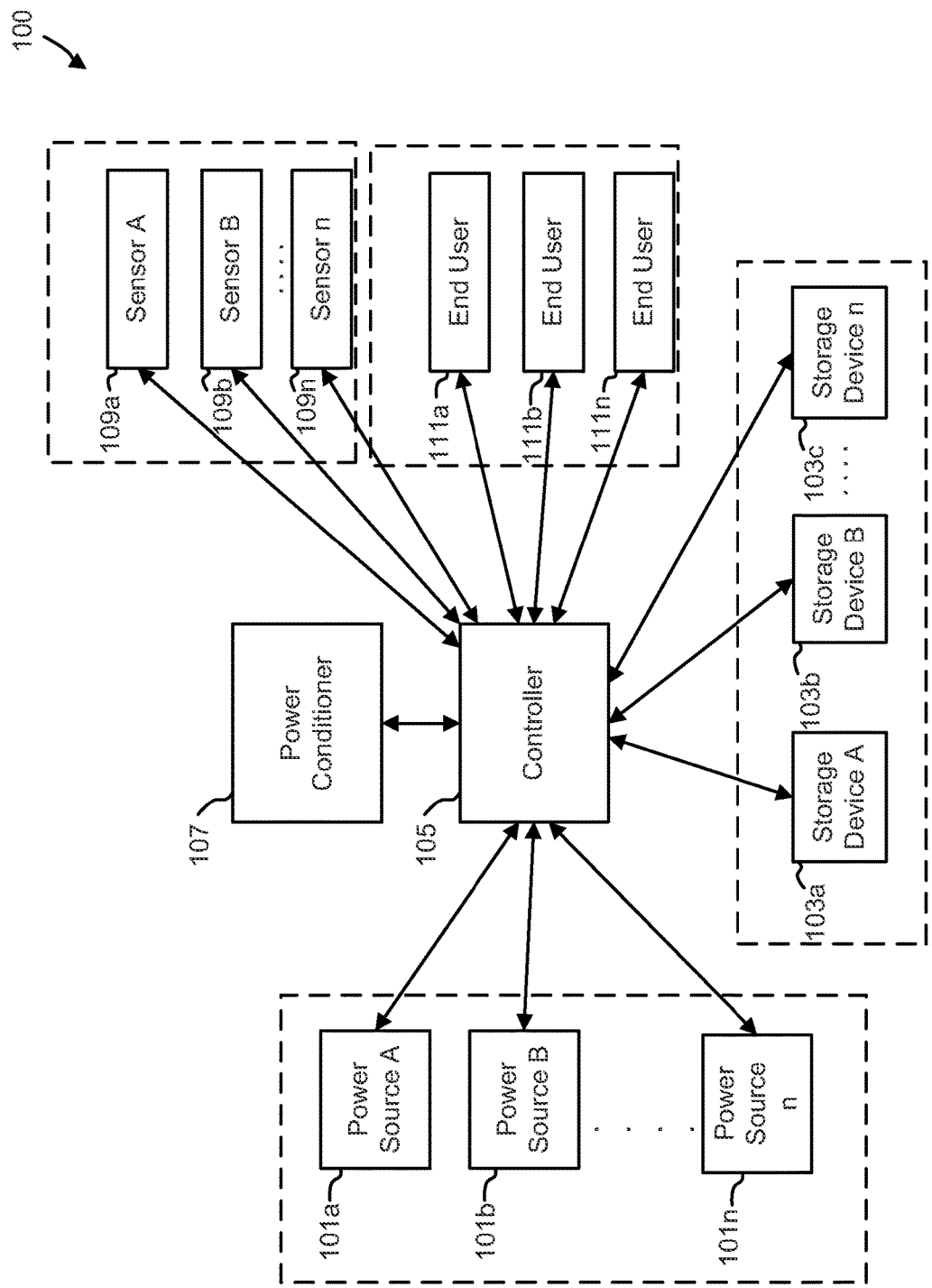
FIG. 1 is a diagrammatic view of a controller and associated power units according to an illustrative embodiment of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a diagrammatic view of a controller 105 and associated power units in an electrical system 100 is shown according to an illustrative embodiment of the present disclosure. A controller 105 receives power from one or more power sources 101a-101n, and the controller 105 may be in communication with a power conditioner 107.

The controller 105 may receive data from one or more sensors 109a-109n, and may store electricity in one or more storage devices 103a-103n, and may deliver the electricity to one or more end users.

In an embodiment, the controller 105 and associated power units in an electrical system 100 may be arranged on land, and may be relatively close together. For example, the electrical system 100 may be located in an encampment or smaller group, such as a building, home, or hospital. In another embodiment, the controller 105 and associated power units in the electrical system 100 may be arranged in a wider distribution, such as in support of a city or town. In yet another embodiment, the controller 105 and associated power units in the electrical system 100 may be arranged on a naval vessel. Other examples may include, but are not limited to, aircraft, submarines, or spacecraft.

The controller 105 may receive input from the power conditioner 107, the one or more power sources 101a-101n, the one or more storage devices 103a-103n, the one or more sensors 109a-109n, and the one or more end users. The controller 105 may perform analysis on the inputs, and may adjust power generation, storage, and distribution according to the input data. In one embodiment, the controller 105 includes one or more electronic processors to analyze the inputs. The controller 105 may also include one or more analog to digital converters, to convert analog inputs from one or more of the sources into digital inputs.

The power conditioner 107 may receive electricity from the power sources 101a-101n and the storage devices 103a-103n, and may normalize the output of the electricity, or may adjust the received electricity from the power sources 101a-101n and the storage devices 103a-103n in other ways. Additionally, the power conditioner 107 may adjust electricity received from the power sources 101a-101n before it is transmitted to the storage devices 103a-103n. For example, and without limitation, the power conditioner 107 may convert the electricity received from the power sources 101a-101n from alternating current (AC) to direct current (DC), or vice versa, so that it may be stored in the storage devices 103a-103n. The power conditioner 107 may operate in communication with the controller 105. For example, data transmitted to the controller 105 may be transmitted, either wirelessly or via a wired connection, to the power conditioner 107. In an embodiment, the power conditioner 107 may receive data input from the power sources 101a-101n and/or the storage devices 103a-103n, and may transmit the data input to the controller 105. Additionally, the power conditioner 107 may transmit additional data regarding the type, amount, or quality of electricity generated by the power sources 101a-101n, or stored or removed from the power sources 101a-101n, or other data regarding the generation and/or storage of electricity.

The power conditioner 107 may include, but is not limited to one or more electronic power control and conditioning (EPCC) systems, sensors 109a-109n deployed with the controller 105, the power conditioner 107, the power sources, and/or the storage devices 103a-103n, one or more artificial intelligence alternative energy (AIAE) systems and/or one or more electronic power control and conditioning (EPCC) modules or systems, or other mobile configurations.

The power sources, denoted as 101a to 101n, may be in electrical communication with either the controller 105 or the power conditioner 107, or both, and may communicate data and/or electricity.

The power sources 101a-101n may include, but are not limited to photovoltaic and/or solar cell power generators, concentrated solar power generators, fossil fuel generators, including gasoline or diesel fuel powered generators, wind turbine or other wind-based power generators, pyrolysis power generators, fuel cell power generators, geothermal power generators, hydroelectric power generators, wave powered power generators, nuclear generators or generators associated with one or more nuclear power plants, or other mobile or fixed power generators. The power sources 101a-101n may also include a connection to a local, national, or international electrical grid. The power sources 101a-101n may include one or more power generation units. For example, a power source may include more than one fossil fuel generator, or more than one wind turbine or panel of solar cells. The power sources 101a-101n may provide electricity in different forms and amounts. For example, a power source may provide AC current, and another power source may provide DC current. The power sources 101a-101n may also provide different voltages, amperages, or frequencies. The power sources 101a-101n may also provide different amounts or types of electricity depending on time. For example, a diesel fuel power generator may provide one amount of electricity at one time, and a different amount at another time.

The power sources 101a-101n may provide data regarding the type or amount of power that is generated, or may provide additional data to the controller 105 and/or the power conditioner 107. For example, and without limitation, the power sources 101a-101n may provide maintenance data, fault indicators, amount of fuel remaining, operating temperatures, current or past status, future operating requirements, or other operating characteristics. The power sources 101a-101n may also accept data. For example, and without limitation, the power sources 101a-101n may accept data regarding the status or other characteristics of other power sources, storage devices 103a-103n, control information, or future operating parameters. Control information may include, but is not limited to, instructions to start generating electricity, instructions to vary the amount or type of electricity generated, or instructions to shut down.

The storage devices, denoted as 103a to 103n, may include chemical or mechanical energy storage. The storage devices 103a-103n may be used to store electricity generated by the power sources 101a-101n, or may be in communication with the controller 105 and/or the power conditioner 107 in a charged state. The storage devices 103a-103n may include, but are not limited to dry and/or wet cell batteries, rechargeable batteries, for example lithium-ion, lithium, nickel-metal hydride, nickel cadmium, lead-acid, or other types of rechargeable batteries, capacitors, fly-wheel energy storage systems, hydraulic energy storage systems, the creation of biofuels, the storage or heated or superheated liquids or solids, steam based systems, pressure based systems, or other mobile configurations.

The storage devices 103a-103n may provide data regarding the type or amount of energy that is stored, or may provide additional data to the controller 105 and/or the power conditioner 107. For example, and without limitation, the power sources 101a-101n may provide maintenance data, fault indicators, amount of energy remaining in the storage device, operating temperatures, current or past status, future operating requirements, or other operating characteristics. The storage devices 103a-103n may also accept data. For example, and without limitation, the storage devices 103a-103n may accept data regarding the status or other characteristics of power sources 101a-101n and/or other storage devices 103a-103n, control information, or future operating parameters. Control information may include, but is not limited to, instructions to provide electricity, instructions to vary the amount or type of electricity provided, or instructions to shut down.

The end users, denoted as 111a to 111n in FIG. 1 and also described with reference to FIG. 2, may be one or more components or devices that use electricity to perform functions. For example, and without limitation, an end user may comprise a computer or computer system or a mechanical device. An end user may also comprise a group of components. The end user may be a distribution node for distribution of electricity to address the demands of a facility, a part of a facility, or a group of devices that use electricity to perform functions.

Figure 2:
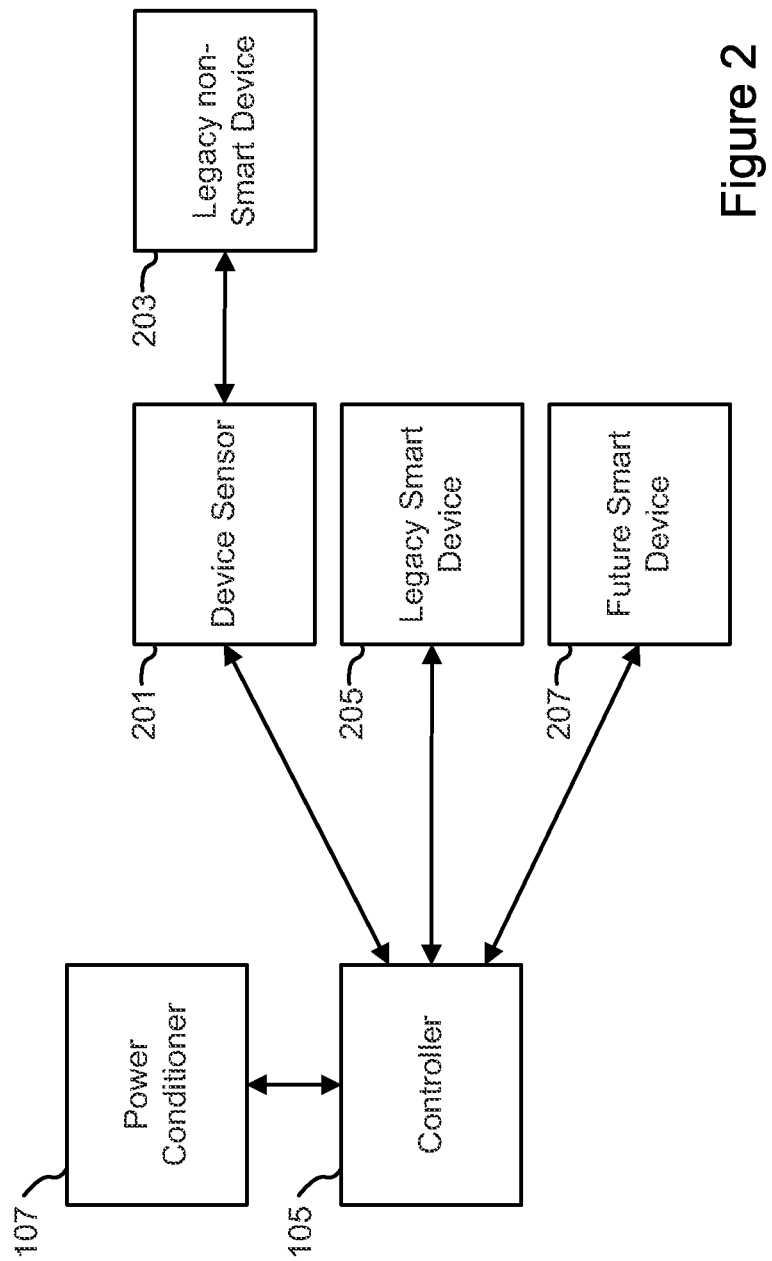
FIG. 2 is a diagrammatic view of a controller and powered devices according to an illustrative embodiment of the present disclosure.

Shown in FIG. 2, the end user device may be a "smart" device 205, 207 or a "non-smart" device 203, and smart devices may be "legacy" 205 or "future" 207 smart devices. A smart device 205, 207 is one that is able to receive information from a controller 105 and use the received information to enable additional features, or is able to transmit information to the controller 105. For example, and without limitation, a smart device 205, 207 may be able to receive information or commands from the controller 105 to shut down, or to reduce the electrical demands on the controller 105, and may be able to perform steps in response to the commands or information received from the controller 105. A smart device 205, 207 may also be able to send information to the controller 105 regarding the device's current and/or future electrical demands, or other information related to the electrical requirements or maintenance of the device. A non-smart device 203 is a device that is not able to receive information from the controller 105, or is not able to transmit information to the controller 105.

A legacy smart device is a device that uses known protocols for receiving information from the controller 105 and transmitting information to the controller 105. The controller 105 may be able to decrypt and/or decode the information received from the legacy smart device 205, and may be able to format information so that the legacy smart device 205 may be able to decrypt and/or decode the information.

A future smart device is a device that may use known protocols, or may use currently unknown protocols for receiving information from the controller 105 and transmitting information to the controller 105. The controller 105 may be able to be updated with additional protocols to replace or add to the one or more protocols of the legacy smart devices 205, so that the controller 105 may be reprogrammed to receive and/or decrypt information from the future smart device 207, and may transmit information to be decrypted and/or decoded by the future smart device 207. The future protocols may be provided to the controller 105, or the controller 105 may interact with the future smart device 207 to learn the new protocols, or the future smart device 207 may provide the controller 105 with the new protocols.

A legacy non-smart device 203 may not be able to communicate directly with the controller 105, and so a device sensor 201 may be placed between the controller 105 and the legacy non-smart device 203. The device sensor 201 may receive information from and transmit information to the controller 105, and may interact with the legacy non-smart device 203, so that the legacy non-smart device 203 may appear to the controller 105 to be a smart device. The device sensor 201 may interact with the legacy non-smart device 203 to allow the legacy non-smart device 203 to perform the commands that the controller 105 transmits to the device sensor 201. For example, the device sensor 201 may have the ability to turn the legacy non-smart device 203 on or off, or may have the ability to collect power requirement data from the legacy non-smart device 203.

Figure 3:
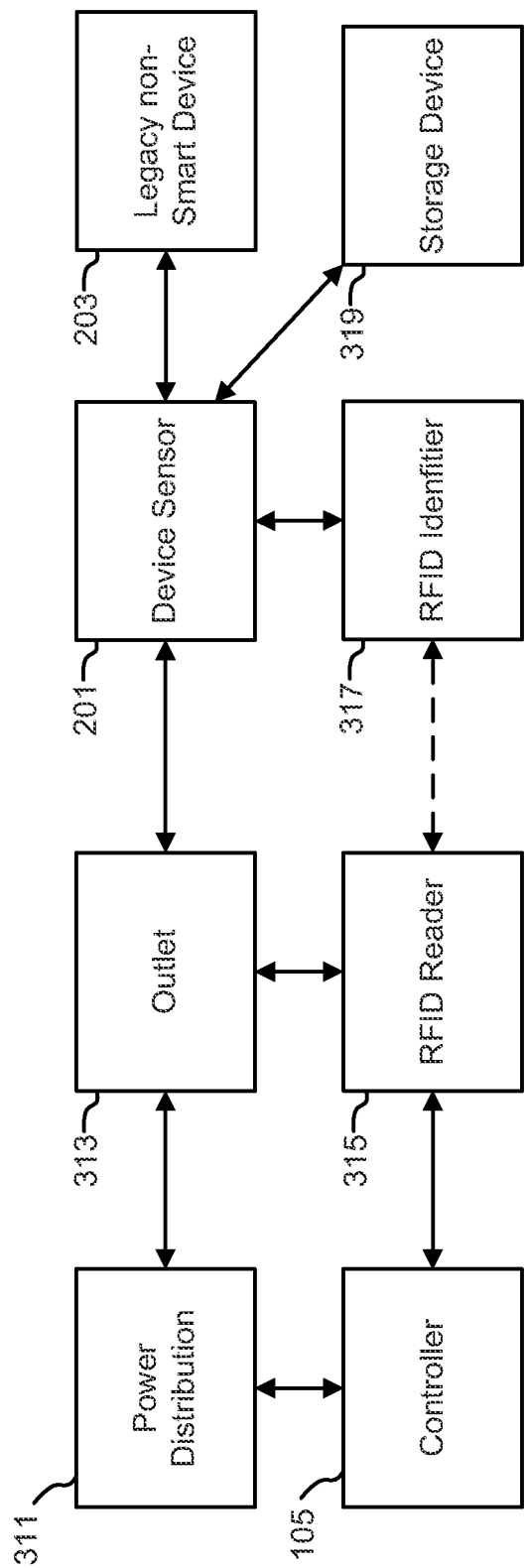
FIG. 3 is a diagrammatic view of a non-smart device and device sensor in relation to an outlet and a controller.

FIG. 3 shows a diagrammatic view of a non-smart device 203 and device sensor 201 in relation to an outlet 313 and a controller 105. A user plugs a device 203 into an outlet 313. The device 203 has an identification device that is encoded with one or more codes. The codes may be, for example and without limitation, a string of letters, numbers, and/or other characters, or another identifier that is readable and presents one or more inputs to a reader. The identifier may be a code that is unique to the device 203, or may contain one or more codes. For example, and without limitation, the identifier may include a unique code, so that every device 203 has a unique identifier. In another embodiment, the identifier may include a code that is not unique to the device 203, along with a code that is unique to the device 203. For example, a non-unique code may include a model code, or a code designating a use or type of equipment, or a code designating the power requirements of the device 203, or a code designating the priority of the device 203. In another embodiment, the identifier is not unique to the device 203, but includes one or more non-unique codes as described above. A unique identifier may include a serial number or other generated code so that a device 203 is uniquely identified.

The device sensor 201 may also include one or more storage devices 319. The storage devices 319 are capable of storing and recalling information stored within the storage device 319. The storage device 319 may be a rewritable memory such as random access memory or an updatable or rewritable memory capable of continuing to store information when electricity is no longer applied. The storage device 319 may also include a hard disk or other fixed or removable medium. The storage device 319 may store information related to, for example and without limitation, historical trends of electricity usage by the device 203, identification of the device 203, including priority or other identifiers, or other information. The information may be updatable by the device sensor 201, or the controller 105 may update the information via, for example, a network connection or other connection between the controller 105 and the device sensor 201.

In one embodiment, the identification device is a radio frequency identification device ("RFID"). The RFID chip may be programmed with the identifiers. In another embodiment, the identification device may include a bar code or other visual indicator of a code, a magnetic carrier, a passive or active radio frequency system to transmit or receive radio frequencies, or a physical connection. The physical connection may include a plug or wire associated with memory or a processor associated with memory to transmit the codes across the physical connection.

An identification device associated with the device interacts with an identification device reader associated with the outlet 313. In the embodiment of FIG. 3, the RFID reader 315 associated with the outlet 313 communicates with the RFID identifier 317 associated with the device sensor 201 or the device 203, and reads the identifier from the RFID identifier 317. The RFID reader 315 may, in one embodiment, store the identifier in memory or other medium, and may transmit the identifier to the controller 105. In the embodiment, the RFID reader 315 is in communication with the controller 105 via, for example and without limitation, a wired or wireless connection. The RFID reader 315 may also, in another embodiment, communicate with the controller 105 via the power lines using a protocol designed for communication over power lines. In an illustrative embodiment, the RFID reader 315 may include multiple RFID readers, and the RFID readers 315 may work in concert to locate the RFID identifier 317 via, for example and without limitation, triangulation of the RFID signal from the RFID identifier 317. The controller 105 may receive the location data from the multiple RFID readers 315 and may use the location data to plot the location of one or more of the RFID identifiers 317 within a geographical location. The controller 105 may aggregate this information and present a map or other pictorial representation of the geographic area or other area on a visual display device, such as a computer monitor or a display of a handheld device such as a smartphone or other portable computer, which may indicate the location of one or more of the RFID identifiers 317.

In an embodiment, the identification device reader associated with the outlet 313 may issue a challenge to the identification device associated with the device 203. The challenge may require the identification device associated with the device 203 to reply with one or more coded sequences, which may be received by the identification device associated with the outlet 313 and may be transmitted to the controller 105. The one or more coded sequences may be encrypted, or may be transmitted in an unencrypted way. The controller 105 and/or the identification device associated with the outlet 313 may receive the one or more coded sequences and may interpret the one or more coded sequences and authenticate the device. If the device 203 is not authenticated, the controller 105 may not provide electricity to the device 203 and/or may send an alert to operators of the controller 105 or other personnel associated with the controller 105. The controller 105 may also write information regarding the attempted access to an access log. If the device 203 is authenticated, the controller 105 may provide electricity to the device according to its requirements and the priority of the device, if a priority is assigned. The controller 105 may also write information regarding the access and authentication to an access log.

Figure 4:
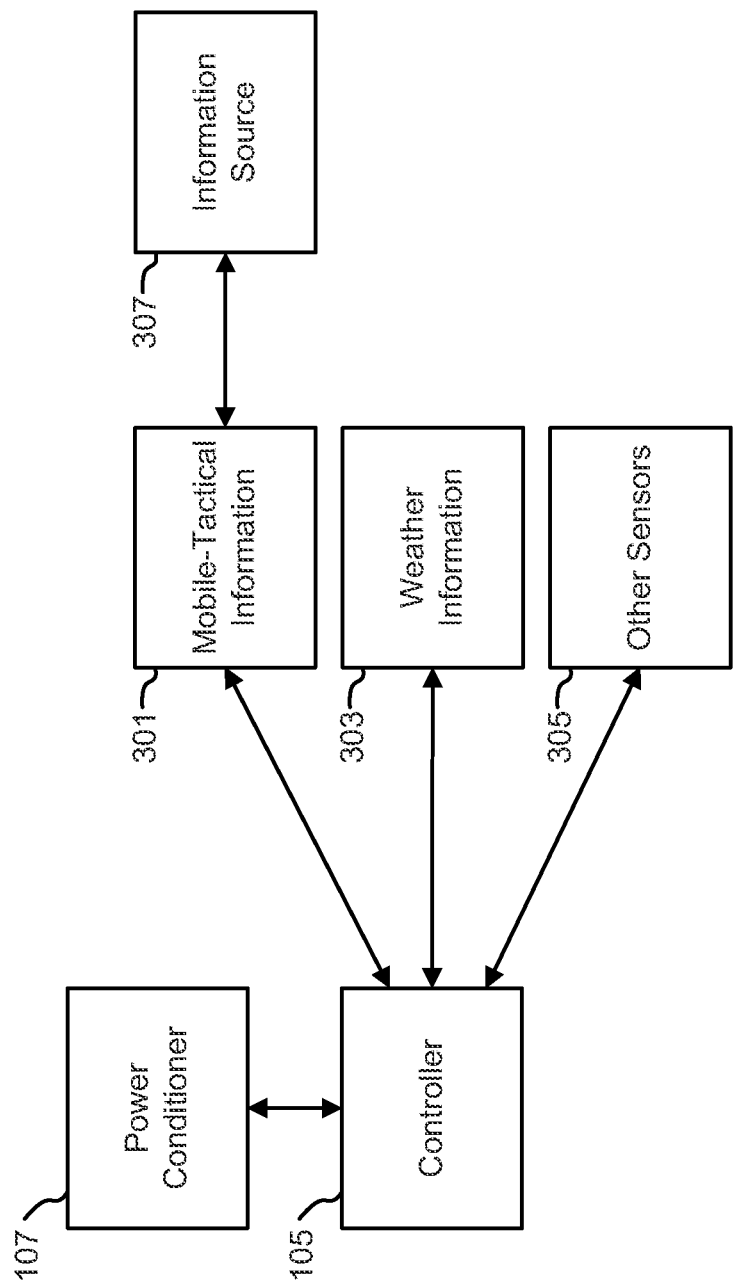
FIG. 4 is a diagrammatic view of a controller and input sensors according to an illustrative embodiment of the present disclosure.

The sensors, denoted as 109a to 109n in FIG. 1 and also described with reference to FIG. 4, may be in communication with the storage devices and/or the power sources. The sensors 109a-109n may measure or record information related to the operation or maintenance of the storage devices and/or power sources. In another embodiment, the sensors 109a-109n may receive data from additional sources. For example, and without limitation, the sensors 109a-109n may be deployed to measure environmental conditions or the environment. The environment or environmental conditions may include, but are not limited to weather characteristics, such as air temperature, wind speed, humidity, barometric pressure, air quality, the presence or absence of particulates, chemicals, or other airborne contaminants, the composition of the air, or future forecasts. The sensors 109a-109n may also be deployed to receive other environmental conditions such as mobile or tactical information, including the position, movement, or number of personnel and/or equipment, the position of geological features and/or terrain characteristics, or the position, movement, and number of airborne forces. The sensors 109a-109n may also receive data regarding current load, predicted load, or scheduled future load. The sensors 109a-109n may also include sensors to receive data from additional sources in other areas, for example data from one or more command and control facilities, satellites, or manned or unmanned aircraft.

In an embodiment, the sensors 109a-109n may receive data, such as command and control data, from command and control facilities. The command and control data may include troop movements and historical, current, and future operational orders. The data may include, for example and without limitation, the number of additional personnel that may draw power from the controller. The data may also include the type of personnel. For example, the data may include that a number of engineers, or a number of doctors or support staff, may draw power from the controller during a time period. The command and control facilities may transmit historical data to the controller regarding the historical trends of the energy usage of the personnel or groups of personnel. The data may also include the equipment that individual personnel or groups of personnel own or are expected to bring to be associated with the controller. For example, a group of equipment may be associated with a group of personnel. The command and control facilities may transmit historical data regarding the equipment associated with the personnel or group of personnel, either individually or as it is associated with the personnel. The data may also include priority information. For example, specific personnel or groups of personnel may be assigned a higher priority than other personnel. The controller may receive the data regarding the personnel and the equipment, and may recommend actions to prepare for the arrival of the personnel. For example, the controller may recommend adding or removing power sources or storage devices based on the information received from the sensors. The command and control facility may store the information to be transmitted to the controller in, for example and without limitation, a database or other electronic file, or a combination of databases and/or other electronic files. The controller may also transmit information to the command and control facility regarding current or historical patterns or usage information for the controller and/or any devices associated with the controller, including data regarding end users or devices.

The sensors 109a-109n may be deployed at or near the site of the power sources, the storage devices, the end users, the controller 105, and/or the power conditioner 107. The sensors 109a-109n may transmit the information to the power conditioner 107 and/or the controller 105 via a wireless connection between the sensor and the controller 105 or power conditioner 107, or via a wired connection. The sensors 109a-109n may transmit the information or receive information via an encrypted link or an unencrypted link over the wireless or wired connection.

The power conditioner 107, the controller 105, the power sources 101a-101n, the storage devices 103a-103n, the sensors 109a-109n, and the end users 111a-111n may all be deployed at the same site, or may be deployed at different locations, and electricity and/or data may be communicated from one location to another location by the use of one or more wires. Electricity and/or data may also be communicated from one location to another location via a wireless connection.

Figure 5:
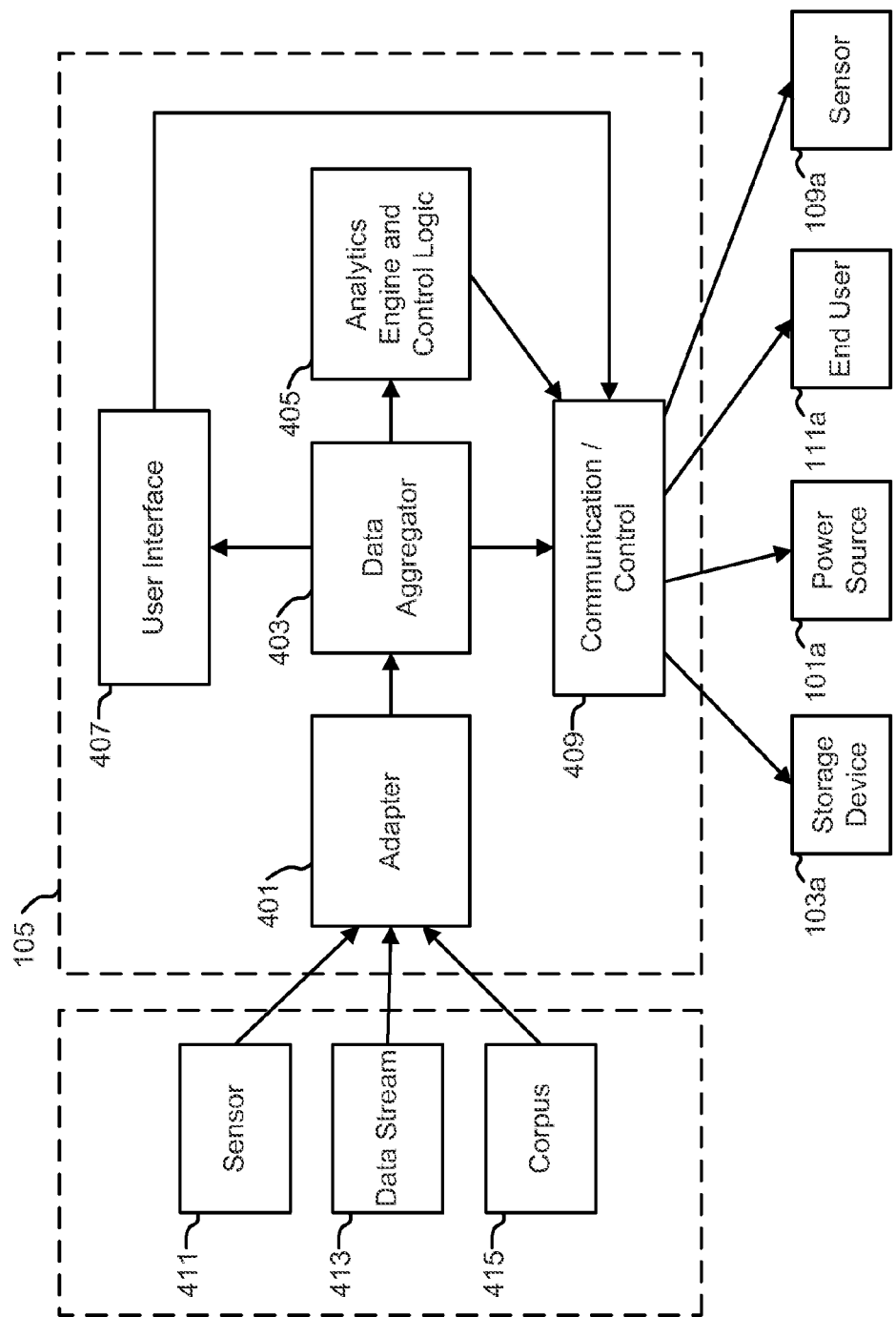
FIG. 5 is a diagrammatic view of controller components receiving and analyzing data according to an illustrative embodiment of the present disclosure.

Turning now to FIG. 5, a diagrammatic view of controller 105 components receiving and analyzing data according to an illustrative embodiment of the present disclosure is shown. The adapter 401, the data aggregator 403, the analytics and control logic 405, the user interface 407, and the communication and control module 409 are all modules that may operate within the controller 105. In one embodiment, the adapter 401, the data aggregator 403, the analytics and control logic 405, the user interface 407, and the communication and control module 409 operate as software executed by one or more processors associated with the controller 105, or as one or more machine implemented processing sequences. The adapter 401, the data aggregator 403, the analytics and control logic 405, the user interface 407, and the communication and control module 409 may be embodied in software, hardware, or a combination of software and hardware. The software may reside in memory that may be addressable by the one or more processors associated with the controller 105.

The adapter 401 may receive information from one or more sensors 411, one or more additional data streams 413, for example data streams from other controllers, or one or more corpus of information 415. The adapter 401 may receive the data over one or more wired or wireless networks, or over one or more dedicated wired links. The adapter 401 may be able to receive and format the data into a consistent form. For example, one or more sensors and one or more future smart devices may be in communication with the adapter 401, and each of the devices may transmit data to the adapter 401 in a different way. The adapter 401 may receive the data inputs from the devices, recognize the protocol or protocols associated with the data inputs, decrypt the data inputs if necessary, and reformat the data inputs into one or more forms for transmission. The adapter 401 may transmit the data inputs to the data aggregator 403. In one embodiment, one or more adapters 401 is provided, with an adapter 401 for each type of data input that is received by the controller 105. In another embodiment, one adapter 401 is used with protocols for each type of data input that is received by the controller 105. The adapter 401 may be able to add to or delete from the protocols that the adapter 401 supports. The additional protocols may be stored as software or hardware associated with the adapter 401.

The data aggregator 403 may receive the formatted data inputs from the adapter 401. The data aggregator 403 may group the data inputs so that further analysis may be possible. For example, the data aggregator 403 may group the data inputs by device, power source, and/or storage device. The data aggregator 403 may reduce the number of data points to create a smaller data set. For example, if a sensor provided data at a rate of five times per second, the data aggregator 403 may take an average of the values to create a per second average, which may then be transmitted to the analytics engine. The data aggregator 403 may also delete data received from the adapter 401 that the analytics engine and control logic 405 does not consider, or that was removed by a user or other administrator. The data aggregated by the data aggregator 403 may be transmitted to the analytics and control logic module 405. The data aggregator 403 may also provide the data to a user interface 407.

The analytics engine and control logic module 405 may receive the data from the data aggregator 403, and may perform calculations on the data to find a mixture of power sources and storage devices to generate the electricity required by the end users. The analytics engine 405 may perform the calculations according to values provided by a user or provided by the components themselves. For example, and without limitation, one or more of the end users may be designated by a user as high-priority, or may self-designate to the controller 105 as high-priority. Similarly, end users may designate or be designated as mid-priority or low-priority. Electricity may be provided to the end users depending on priority or other settings provided by a user. Similarly, sensor data may be used to determine which power sources or storage devices may be used to provide electricity to the end users.

The analytics engine and control logic module 405 may include first, second, and third plurality of processing sequences. The first plurality of processing sequences may include one or more processing sequences adapted to perform interface activities with, for example, a plurality of potential disruption event databases. The second plurality of processing sequences may be adapted to perform business analytics processing based on a plurality of business analytics data. The third plurality of processing sequences may be adapted to produce a plurality of outputs comprising first, second, and third outputs. The potential disruption event databases may include, but are not limited to, data from sensors, data from command and control facilities, data for weather including tsunami reporting, and other real time event reporting databases including national security, civil defense, weather, and intelligence threat databases. The plurality of business analytics data may include, but is not limited to network component data, network data, node power requirements, node chain power consumption data, equipment or function priority data, location data, power grid data, supported entity/mission data, predicted power disruption impact data, power disruption cost data, threat to life indicator, threat to property indicator, threat to critical infrastructure indicator, threat to critical subsystem indicator, lost opportunity cost from disruption data, predicted time of disruption data.

The first output may include a network disruption prediction report comprising a list of network nodes, missions, locations or other elements which are presently at risk or are predicted to be at risk at a predetermined time based at least in part on outputs from the first, second, and third processing sequences, the plurality of business analytics data, the data from the potential disruption event database, and data provided by the at least one device sensor. The predetermined time may include, for example and without limitation, 72 hours. In other embodiments, the predetermined time may be greater or less than 72 hours. The second output may include, but is not limited to, a list and at least one network diagram showing a plurality of proposed network disruption prevention actions determined based on: outputs from the first, second, and third processing sequences, the plurality of business analytics data, the data from the potential disruption event database, and data provided by the at least one device sensor. The third output may include, but is not limited to, a critical path listing showing critical elements, nodes, or links from the first output with a proposed corrective action, including corrective actions which are automatically implemented by the electrical system.

For example, and without limitation, sensors may indicate that the weather is cloudy, or that the sun is setting. The controller 105 may recognize that a photovoltaic power source is providing electricity, and may start additional non-photovoltaic power sources, if available, or may begin to discharge one or more battery storage devices. In another example, sensors may indicate that power from a local, regional, national, or international power grid is fluctuating out of acceptable parameters, which may be set by a user. The analytics engine 405 may start additional generators to compensate for the loss of electricity from the power grid. In yet another example, the analytics engine 405 may recognize that a certain time period includes an increased cost per watt figure from the power grid. The analytics engine 405 may begin to discharge one or more storage devices, or may rely on other power sources, so that the controller 105 may reduce the electricity coming from the power grid, if the cost to discharge the storage devices or the alternate power sources is lower than the increased cost of electricity from the power grid.

The user interface 407 may be one or more devices to accept input and to generate output. The user interface 407 may take the form of, for example and without limitation, a graphical user interface 407 or a command line interface. The interface may allow a user to set parameters in the analytics engine 405, the data aggregator 403, or the communications and control module 409. In one embodiment, the user interface 407 is provided via a graphical user interface 407 on a computer. The computer may be in communication with the controller 105 via a wired or wireless network, or the computer may be in communication with the controller 105 via a dedicated wired or wireless link. In another embodiment, the user interface 407 may be a graphical user interface 407 provided on a portable computer, such as a smart phone or other personal data assistant. The smart phone or assistant may be powered by one or more batteries, and may be in communication with the controller 105 via a wireless network or dedicated wireless link.

The communication and control module 409 may communicate with the analytics engine 405, and may provide commands provided by the analytics engine 405 to one or more sensors, or one or more end users, storage devices, or power sources. The communication and control module 409 may be in communication with the one or more sensors 109a, or one or more end users 111a, storage devices 103a, or power sources 101a via a wired or wireless network, or via a wired or wireless dedicated link.

Figure 6:
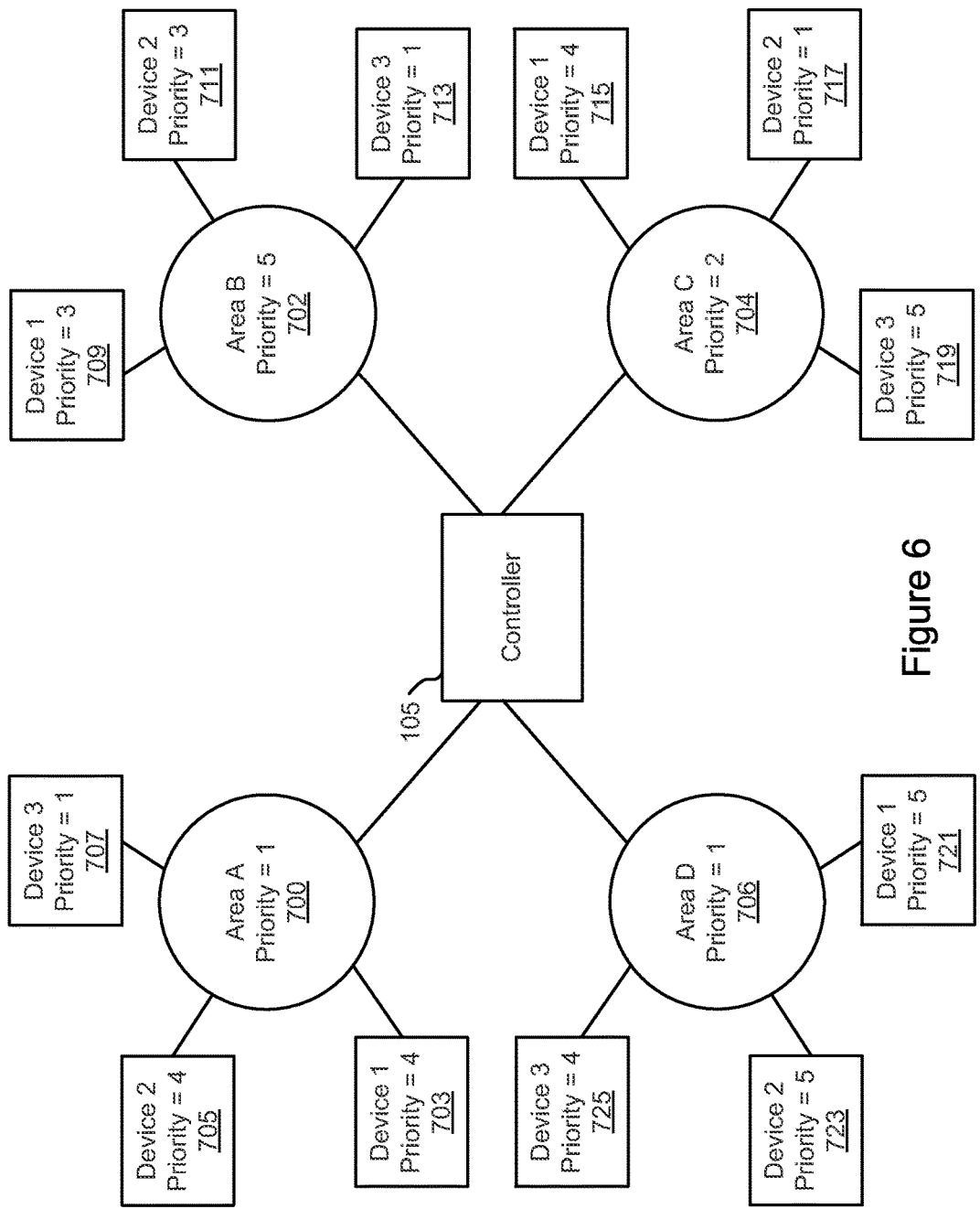
FIG. 6 is an exemplary diagram of a group of areas and a group of devices, each having a priority according to an illustrative embodiment of the present disclosure.

Turning now to FIG. 6, an exemplary diagram of a group of areas and a group of devices, each having a priority, is shown according to an illustrative embodiment of the present disclosure. In the example, a controller 105 is associated with four areas. Area A 700, with a priority of 1, has three associated devices, Device 1 703 with a priority of 4, Device 2 705 with a priority of 4, and Device 3 707 with a priority of 1. Area B 702, with a priority of 5, has three associated devices, Device 1 709 with a priority of 3, Device 2 711 with a priority of 3, and Device 3 713 with a priority of 1. Area C 704, with a priority of 2, has three associated devices, Device 1 715 with a priority of 4, Device 2 717 with a priority of 1, and Device 3 719 with a priority of 5. Area D 706, with a priority of 1, has three associated devices, Device 1 721 with a priority of 5, Device 2 723 with a priority of 5, and Device 3 725 with a priority of 4. In the example, priority numbers may range from 1 to 5, with 1 being the highest priority and with 5 being the lowest priority. In the example, the controller 105 provides power with preference to the highest priority devices. If there is not enough power to provide adequate power to each of the devices associated with the controller 105, then the controller may restrict power to one or more devices, and may restrict power based on priority. The controller 105 may restrict power based on the Area priority, the device priority, or a combination of Area and device priority. For example, Device 1 725 of Area D 706 has a priority of 5. If the controller 105 restricts power based on device priority, then Device 3 713 of Area B 702 may receive power preferentially over Device 1 725, as Device 3 713 has a higher priority, even though Area B 702 has a lower priority than Area D 706. If the controller 105 restricts power based on Area priority, then Device 1 725 of Area D 706 may receive power preferentially over Device 3 713 of B 702, as Area B 702 has a lower priority than Area D 706. If the controller 105 provides power with preference to a combination of device and area priority, then the controller may sum or average the device and area priority to achieve an aggregated priority number, and may allocate power based on the aggregated priority number.

In an embodiment, priority may also be determined by a user. For example, and without limitation, a user with a high priority may authenticate himself or herself to a device 203. The user may have a priority depending on their status in an organization, for example rank, or may be assigned a priority based in part on their assigned tasks or responsibilities. The authentication may include, but is not limited to, the insertion of a control card, a password, a biometric identifier, or other identifier to uniquely identify one or more users. The authentication may include an encrypted certificate, which is transmitted to a controller 105 and compared against a central database of certificates. The controller 105 may take the user's priority into account when calculating the priority of a plurality of devices in the system.

If a controller 105 cannot deploy adequate power to all of the devices on a system, as during, for example, a failure of one or more power generators or an excess number of devices 203 associated with the controller 105, the controller 105 may attempt an orderly shutdown of one or more devices 203. For example, and without limitation, the controller 105 may transmit a message to a computer system notifying users that the particular computer system will shutdown in a minute, or another length of time specified by the controller 105 or by the computer system. The computer system may take measures to shutdown in an orderly manner, such as saving settings or files to non-volatile memory or transferring functions or files to another computer system that may not be affected by the shutdown. The affected computer system may notify the user of available computer systems that are not affected by the shutdown, so that the user may transfer functions or files to another computer system. In an embodiment, the user may override the shutdown of a particular system. The override may include that the user present credentials that allow the user to override the shutdown. For example, and without limitation, the user may require the computer system for a mission-critical application. The user may provide credentials to override the shutdown. The information may be transmitted to the controller 105, and the controller 105 may authenticate the user's credentials and apply the override if the credentials are accepted. In an embodiment, the controller 105 may also restart one or more devices 203 that have been shut down, if adequate power supplies are enabled or restored.

In an embodiment, the controller 105 may optimize the priorities of one or more devices 203 so that, if necessary, an orderly shutdown of devices may allow the controller 105 to maintain electricity to critical devices. For example, a device 203 with a high priority, when associated with a first controller, may not have the same priority when associated with a second controller. The second controller may reassign the priority of the device 203 based on the priorities of the other devices associated with the second controller and with the overall mission and responsibilities of the second controller. If one or more controllers are in communication with each other, then optimization may occur over a local level at the individual controllers, at a regional level with one or more controllers, and/or at a global level with all associated controllers. The controllers may exchange priority information with each other, or may communicate priority information to a regional or global system or systems that may receive the information, determine priorities on a regional or global basis, and communicate new priority information to the controllers.

The communication of the devices to the controller 105 may also allow the controller to construct a map showing the location of each of the devices 203. For example, the controller 105 may have the ability to determine the location of one or more of the electrical outlets 313, and the electrical outlets may communicate if a device 203 or device sensor 201 is attached to the electrical outlet 313. The controller 105 may aggregate this information and present a map or other pictorial representation of the geographic area on a visual display device, such as a computer monitor or a display of a handheld device such as a smartphone or other portable computer, and may present the devices that are attached to the controller 105 on the map. The display may form a portion of a graphical user interface such that a user or operator may be able to navigate the map and select operating parameters for each of the devices associated with the controller 105.

Figure 7:
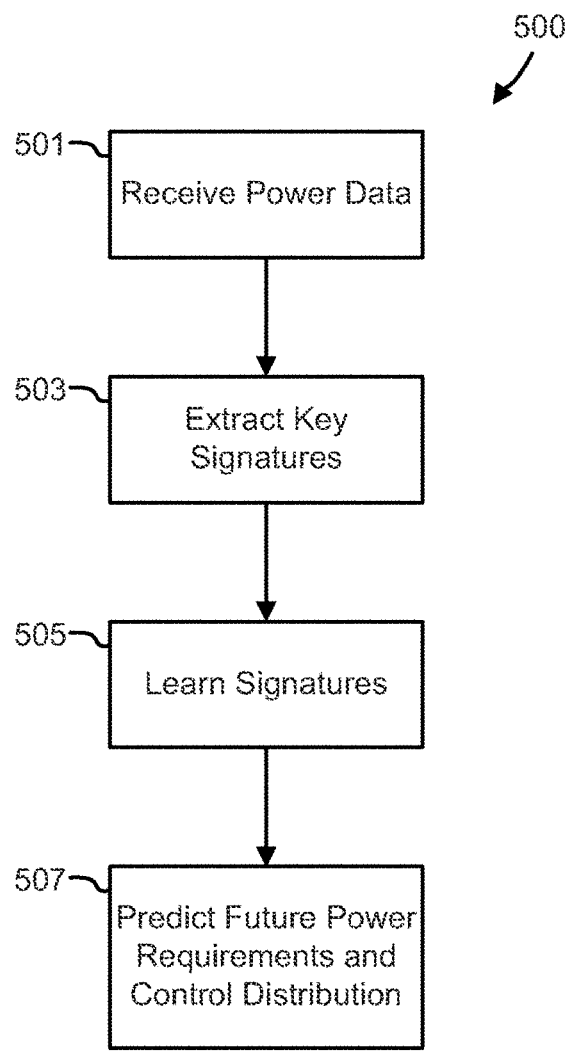
FIG. 7 is a flow chart depicting data acquisition and analysis according to an illustrative embodiment of the present disclosure.

Turning now to FIG. 7, a flow chart depicting data acquisition and analysis according to an illustrative embodiment of the present disclosure is shown. In box 501, the controller 105 may receive power data. As shown above, the controller 105 may receive power data from the sensors and/or the legacy or future smart devices through the adapter or adapters.

In box 503, the data is aggregated by the data aggregator and key signatures are extracted. The key signatures may include, for example and without limitation, voltage and amperage information, power type, quality requirements, or other requirements, and time. The key signatures may indicate, for a given end user and a given time, the aggregated power requirement data indicating periods of use or non-use. For example, a signature may indicate that an end user device may be active at 90% between the hours of 3 AM and 9 AM, may be active at 45% between the hours of 9 AM and 3 PM on weekdays, and may be inactive between 3 PM and 3 AM on the weekdays and all day on the weekends. Signatures may be created for each end user, and the signatures may me aggregated across each of the end users, so that power requirements may be calculated, for example, per day.

In box 505, the signatures extracted in box 503 are analyzed and the controller 105 attempts to learn the signatures. For example, the controller 105 may analyze the data from box 503, and may determine that additional power sources must be brought online to meet the demand of the end user device operating at 95%, or that one or more storage devices must be discharged to meet the demand of the end user device operating at 95%.

In box 507, the controller 105 attempts to predict future power requirements, and may adjust the power sources, storage devices, end users, and/or sensors in an attempt to anticipate the future power requirements. For example, given the example shown with regards to box 505, the controller 105 may bring additional power sources on line or may discharge one or more storage device while the end user device is 90% active, may reduce the output of the power sources, or may reduce or stop the discharge of the storage devices.

While this disclosure has been described as pertaining to the distribution of electricity to one or more devices, the system may distribute any resource in limited supply, and other applications may also be apparent. For example, and without limitation, the controller 105 may operate to control the distribution of bandwidth for a network, so that devices that are associated with the controller 105 may have a priority, and the controller 105 may allocate available bandwidth for a network based on a device's priority. In an embodiment, the controller 105 may operate to control the distribution of solids, liquids, or gasses to one or more devices and/or users associated with the controller 105.

While this disclosure has been described as having an exemplary design, the present disclosure may be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

The invention claimed is:

1. An automated electrical system control system, comprising:
   an automated electrical system controller system including an interface section and a machine readable storage section comprising a machine readable instruction and data storage medium altered to store non-transitory machine readable instructions configured to be read by and operate said automated electrical system controller system comprising a plurality of said instructions to selectively generate a plurality of data structures and a plurality of non-transitory machine readable instructions for operating the automated electrical system controller system to communicate with a plurality of sensors, creating/updating a plurality of said data structures comprising electrical resource management data structures, controlling a plurality of energy production sources, controlling a plurality of energy storage devices operable to respectively store electrical and mechanical energy, and controlling a plurality of energy consumption devices operable to consume respectively said electrical and mechanical energy, wherein said plurality of non-transitory machine readable instructions comprising a first, second, and third plurality of non-transitory machine readable instructions;
   wherein the first plurality of non-transitory machine readable instructions are adapted to operate said interface section to perform data interface actions with a plurality of potential disruption event databases comprising databases comprising:
      failure status, degradation status, maintenance downtime schedule data, and operating information data from command, control, and energy transportation facilities operating or connected with said plurality of energy production sources and said plurality of energy consumption devices;
      weather data from weather sources for areas where said plurality of energy production sources are located and a plurality of energy consumption devices are located including tsunami reporting and other real time event reporting databases; and
      national security, civil defense, and intelligence threat databases;
   wherein the second plurality of non-transitory machine readable instructions are adapted to perform business analytics processing based on a plurality of business analytics data stored at least in said automated electrical system controller system, wherein said second plurality of non-transitory machine readable instructions comprises instructions configured to generate and execute an analytics engine in said automated electrical system controller system comprising a decision engine section and rule base section executed by said decision engine section comprising a plurality of rules for operating the automated electrical system controller system to execute power planning decisions that operates based on said business analytics data and said rule base section, wherein the plurality of business analytics data comprises network component data, network data, node power requirements, node chain power consumption data, equipment or function priority data, location data, power grid data, supported entity/mission data, predicted power disruption impact data, power disruption cost data, threat to life indicator, threat to property indicator, threat to critical infrastructure indicator, threat to critical subsystem indicator, lost opportunity cost from disruption data, and predicted time of disruption data;
   wherein the third plurality of machine readable instructions is adapted to control said automated electrical system controller system to produce a plurality of outputs comprising first, second, and third outputs;
   a plurality of some of said sensors comprising environmental sensors are configured to measure and generate measurement outputs related to environmental conditions of one or more environments surrounding the plurality of said environmental sensors and transmit the output to the automated electrical system controller system, wherein said sensors measure said one or more environmental conditions that will or may impact production or consumption of electricity associated with said plurality of energy consumption devices;
   at least one said energy production source is in electrical communication with the automated electrical system controller system;
   at least one said energy storage device is in electrical communication with the automated electrical system controller system;
   at least one said energy consumption device; and
   at least one said device sensor in communication with the automated electrical system controller system and an end user interface system, the at least one device sensor including memory, the memory including priority information regarding a priority of one or more said energy consumption devices associated with the at least one device sensor, the at least one device sensor operable to transmit information to the automated electrical system controller system, wherein the automated electrical system controller system selectively energizes or deenergizes the devices associated with the at least one device sensor or vary energy produced by said energy production sources based at least in part on the priority information associated with each of the at least one device sensors and on available energy produced by the at least one said power production source as well as energy consumption of at least one said energy consumption devices receiving energy generated by said at least one energy production source.

2. The automated electrical system control system of claim 1, further comprising at least one smart power consumption device, the at least one smart device operable to transmit information to the automated electrical system controller system without the use of the at least one device sensor.

3. The automated electrical system control system of claim 1, wherein the first output comprises a network disruption prediction report comprising a list of network nodes, missions, locations or other elements comprising one or more said energy production sources which are presently at risk or are predicted to be at risk within 72 hours or less based on:
   outputs from the first, second, and third machine readable instructions,
   the plurality of business analytics data,
   the data from the potential disruption event database, and
   data provided by the at least one device sensor;

wherein the second output comprises a list and at least one network diagram showing a plurality of proposed network disruption prevention actions determined based on:
outputs from the first, second, and third machine readable instructions,
the plurality of business analytics data,
the data from the potential disruption event database, and
data provided by the at least one device sensor; and
wherein the third output comprises a critical path listing showing critical elements, nodes, or links from the first output with a proposed corrective action, including corrective actions which are automatically implemented by the electrical system.

4. The automated electrical system control system of claim 3, further comprising at least one portable computer in communication with the automated electrical system controller system to issue commands to the automated electrical system controller system, the at least one portable computer including an input/output portion adapted to display a graphical interface showing the first, second, and third outputs.

5. The automated electrical system control system of claim 1, wherein the at least one power production source is at least one of a photovoltaic generator, a solar cell power generator, a concentrated solar power generator, a fossil fuel generator, a wind turbine generator, a pyrolysis power generator, a fuel cell power generator, a geothermal power generator, a hydroelectric power generator, a nuclear power plant, a wave powered power generator, or a connection to a local, national, or international electrical grid.

6. The automated electrical system control system of claim 1, wherein the plurality of energy storage devices comprises at least one of dry cell batteries, wet cell batteries, rechargeable batteries, capacitors, fly-wheel energy storage systems, hydraulic energy storage systems, steam based systems, pressure based systems, the creation of biofuels, or the storage or heating of heated liquids or solids.

7. The automated electrical system control system of claim 6, wherein the rechargeable batteries comprises at least one lithium-ion, lithium, nickel-metal hydride, nickel cadmium, or lead-acid rechargeable batteries.

8. The automated electrical system control system of claim 1, further comprising a power conditioner in electrical communication with the automated electrical system controller system, wherein said power conditioner comprises a section that receives commands from said automated electrical system controller system to convert power output from said energy production sources or energy storage devices to alter or change said power output to configure said power output that was configured for one said energy consumption device so it is compatible with a different said energy consumption device that has different power conditioning requirements.

9. The automated electrical system control system of claim 1, wherein the automated electrical system controller system is operable to choose one or more of the one or more energy production sources to generate electricity based at least in part on the input received from the plurality of sensors.

10. The automated electrical system control system of claim 1, wherein the plurality of sensors include at least one sensor to measure tactical information, said tactical information comprising position, movement, or number of personnel or equipment, a position of geological features or terrain characteristics, or the position, movement, and number of Government forces.

11. The automated electrical system control system of claim 1, wherein the priority information is transmitted to the automated electrical system controller system over a power line.

12. The automated electrical system control system of claim 1, wherein the priority information is stored in one or more radio frequency identification devices (RFID) associated with each of the at least one device sensors.

13. The automated electrical system control system of claim 1, wherein location of the RFID is tracked by a plurality of RFID sensors.

14. The automated electrical system control system of claim 1, wherein the device sensor further transmits one or more codes to the automated electrical system controller system, and wherein the automated electrical system controller system interprets the one or more codes and energizes the device sensor based on the acceptance of one or more of the one or more codes.

15. The automated electrical system control system of claim 1, wherein the priority information associated with each of the at least one device sensors is changed based on the priority of the user operating the device sensor.

16. An automated electrical system controller comprising:
a machine readable storage medium altered to comprise a plurality of non-transitory machine readable instructions, comprising:
an adapter to receive data inputs including potential electrical power disruption related data from a plurality of environmental sensors operable to receive input related to one or more environments or surroundings or monitored by the plurality of environmental sensors, wherein said environmental sensors measure the one or more environmental conditions that will or may impact production, storage, or consumption of electricity associated with at least one of a plurality of electrical systems comprising one or more energy production systems that supply electrical power to one or more electrical energy consumption devices, said electrical energy consumption devices, and one or more electrical storage devices that supply electrical power to at least one of said electrical energy consumption devices;
a data aggregator to receive data from the adapter and group or organize the data including the potential electrical power disruption related data;
an analytics engine to receive the data comprising grouped or organized data from the data aggregator and analyze the data comprising the potential electrical power disruption related data to generate one or more power disruption determination output data based on matching at least one or more of said potential electrical power disruption related data with at least one power disruption condition comprising said one or more environmental condition that has occurred that will or may impact production, storage, or consumption of electricity associated with at least one of said plurality of electrical systems, the analytics engine outputs and said one or more power disruption determination output data;
a control module configured to receive said one or more power disruption determination output data from the analytics engine and output one or more power control commands to one or more of said plurality of electrical systems; and
at least one or more device sensors in communication with an end user, the at least one device sensors including memory, the memory including priority information regarding a priority of at least one of said plurality of electrical systems that are associated with one or more of the at least one device sensors, the at least one device sensors operable to transmit information to the adapter, wherein the control module selectively energizes or deenergizes at least one of the plurality of electrical systems that are associated with one or more of the device sensors based at least in part on one or more of the priority information and on available energy produced by at least one said energy production systems and energy consumed by at least one said energy consumption devices receiving energy generated by said at least one energy production systems.

17. The automated electrical system controller of claim 16, wherein the plurality of environmental sensors include at least one sensor to measure tactical information comprising position, movement, or number of personnel or equipment, a position of geological features or terrain characteristics, or position, movement, and number of government forces.

18. The automated electrical system controller of claim 16, wherein the analytics engine is operable to choose one or more of the one or more said energy production systems to generate electricity based at least in part on the input received from the plurality of environmental sensors.

19. The automated electrical system controller of claim 16, further comprising at least one portable computer in communication with the electrical system controller to issue commands to the electrical system controller.

20. The automated electrical system controller of claim 16, wherein the priority information is transmitted to the adapter or device sensors over a power line.

21. The automated electrical system controller of claim 16, wherein the priority information is stored in RFID associated with each of the at least one device sensors.

22. A method of operating an electrical system controller configured for predicting electrical requirements and electrical power disruptions and automatically controlling electrical equipment based on predictions of said electrical requirements and electrical power disruptions by said electrical system controller, comprising:

operating a control system to receive a plurality of data from one or more data input sources including at least one environmental sensor operable to receive a plurality of first inputs related to one or more environments and at least one device sensor operable to receive a plurality of second data from one or more end users regarding power usage and future requirements of one or more energy production sources and one or more devices comprising electrical consumption devices that receive power from at least one said energy production source, the at least one device sensor including memory, the memory including priority information regarding an assigned priority of each said one or more devices that is associated with each said at least one device sensor, the at least one device sensor operable to transmit device sensor information to said control system including said priority information;

operating said control system to extract key signatures from the plurality of first data received from the one or more data input sources based on matching one or more of said plurality of first data with a library comprising at least one or more power disruption event data associated with the electrical production devices which supply power to said electrical consumption devices;

operating said control system to learn and store the key signatures extracted from the plurality of first data received from the one or more said data input sources;

operating said control system to predict future power requirements or power disruptions associated with the key signatures and generate one or more future power requirement or power disruption predictions data; and operating said control system to control power generation by at least one power production source as well as storage, and distribution of outputs of said power production source according to the one or more future power requirements or the power disruption predictions data by selectively energizing or deenergizing one or more of the devices associated with the at least one device sensor based at least in part on receipt of the one or more predictions, the priority information associated with each of the at least one device sensors and on available energy produced by at least one said power production source.

* * * * *